United States Patent
Ackerman et al.

(10) Patent No.: US 9,700,020 B2
(45) Date of Patent: Jul. 11, 2017

(54) ANIMAL FLOTATION DEVICE

(71) Applicants: Ginger Ackerman, Gainesville, GA (US); Josette Fleszar, Gainesville, GA (US); Julie Graves, Gainesville, GA (US); William Graves, Gainesville, GA (US)

(72) Inventors: Ginger Ackerman, Gainesville, GA (US); Josette Fleszar, Gainesville, GA (US); Julie Graves, Gainesville, GA (US); William Graves, Gainesville, GA (US)

( * ) Notice: Subject to any disclaimer, the term of this patent is extended or adjusted under 35 U.S.C. 154(b) by 0 days.

(21) Appl. No.: 15/071,585

(22) Filed: Mar. 16, 2016

(65) Prior Publication Data

US 2016/0272285 A1  Sep. 22, 2016

Related U.S. Application Data

(60) Provisional application No. 62/133,826, filed on Mar. 16, 2015.

(51) Int. Cl.
*B63C 9/08* (2006.01)
*B63C 9/28* (2006.01)
*A01K 29/00* (2006.01)
*A01K 1/035* (2006.01)
*B63B 9/04* (2006.01)
*B63B 35/58* (2006.01)
*B63B 35/73* (2006.01)

(52) U.S. Cl.
CPC .............. *A01K 29/00* (2013.01); *A01K 1/035* (2013.01); *B63B 2035/737* (2013.01)

(58) Field of Classification Search
CPC ........ A01K 1/035; A01K 29/00; B63B 35/58; B63B 35/607; B63B 35/613; B63B 35/62; B63B 35/73; B63B 35/74; B63B 35/76; B63B 2035/735; B63B 2035/737; B63B 2035/738
USPC .................. 441/35, 44, 47, 50, 129; 114/343
See application file for complete search history.

(56) References Cited

U.S. PATENT DOCUMENTS

| 6,234,857 B1 * | 5/2001 | Suellentrop | B63B 35/76 114/346 |
| 2010/0093236 A1 * | 4/2010 | Harris | B63B 35/73 441/129 |

* cited by examiner

*Primary Examiner* — Daniel V Venne
(74) *Attorney, Agent, or Firm* — Dunlap Bennett & Ludwig PLLC

(57) ABSTRACT

An animal flotation device is provided. The animal flotation device is a non-inflatable, semi-submersible flotation apparatus for a dog to stably sit, lay and move about while partially submerged in a body of water of any depth. The animal flotation device may have a peripheral portion defining an interior portion. The interior portion provides a generally rigid area adapted to become semi-submersed within the body of water when supporting the dog, whereby the peripheral portion provides buoyancy and stability to the semi-submersed interior portion so that the dog may move around and feel safe while floating atop the body of water.

8 Claims, 4 Drawing Sheets

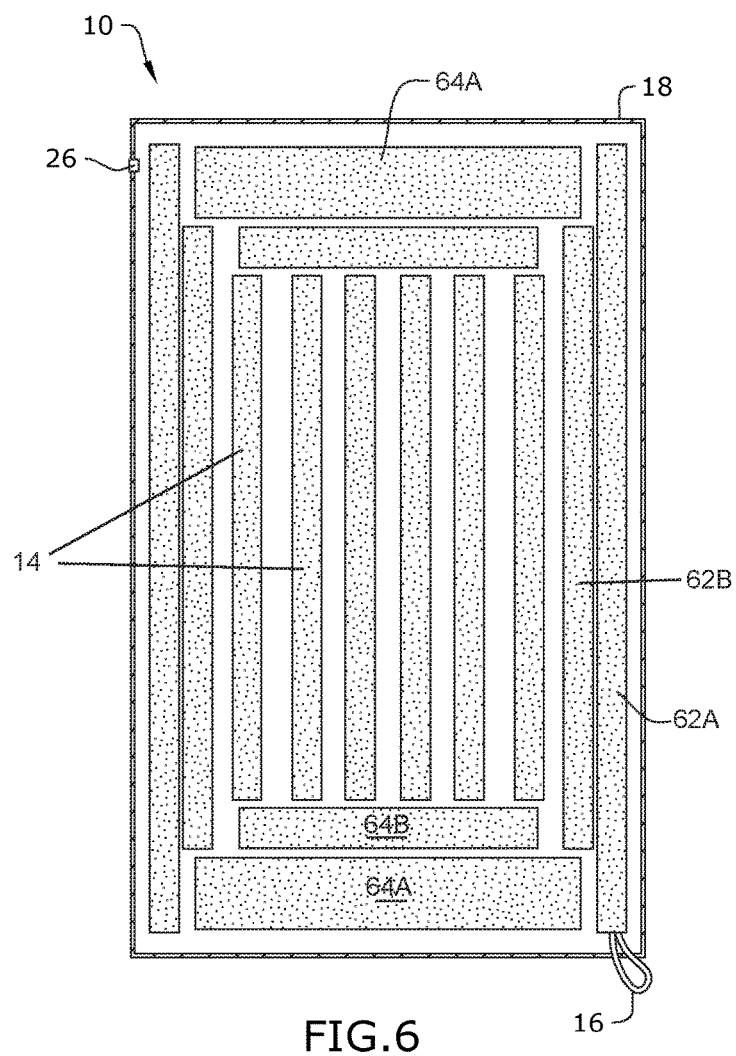
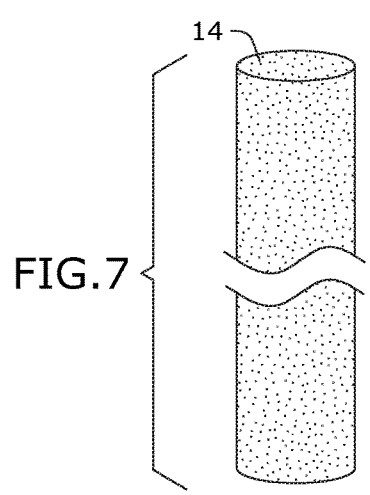

ANIMAL FLOTATION DEVICE

CROSS-REFERENCE TO RELATED APPLICATION

This application claims the benefit of priority of U.S. provisional application No. 62/133,826, filed 16 Mar. 2015, the contents of which are herein incorporated by reference.

BACKGROUND OF THE INVENTION

The present invention relates to flotation devices and, more particularly, to a non-inflatable, semi-submersible flotation apparatus for a dog to stably sit, lay and move about while partially submerged in a body of water of any depth.

Pet owners like to take their dogs to the lake, beach or pool so they can enjoy the water with them. Currently, dog owners are faced with either letting their dogs use flotation devices designed for humans or 'dog floats' designed for dogs, each having significant drawbacks. Flotation devices designed for humans, such as rafts, are typically made of flimsy material and so susceptible to puncture and ripping at the paws of the dogs, which, because they are inflatable, is very problematic. Dog floats', though putatively designed for dogs, harbor their own risks: being very difficult to get on even with significant human intervention, causing a hazard by tiring out the dog and owner; and keeping the dog riding completely out of the water once they get on the float, causing sun and heat exposure without the aid of water to cool them down, risking heat stroke.

Both human floatation devices and dog floats are insufficient for another reason: they fail to accommodate a dog's need and desire for freedom of movement. As a result, such current apparatuses are not designed to be stable while the dog moves about, causing the dog to feel unsafe and thus instinctively urging the dog to leap off such apparatuses.

As can be seen, there is a need for a non-inflatable, semi-submersible flotation apparatus for a dog to stably sit, lay and move about while partially submerged in a body of water of any depth.

SUMMARY OF THE INVENTION

In one aspect of the present invention, an animal flotation device includes a housing membrane having an interior portion connected to and defined by a peripheral portion, wherein the interior portion provide a semi-rigid platform, and wherein the periphery portion provides a buoyancy so that the interior portion becomes semi-submerged when the device is place on a body of water, wherein the interior portion is dimensioned to accommodate a canine of any size.

In another aspect of the present invention, an animal flotation device includes a water permeable housing membrane having an interior portion connected to and defined by a peripheral portion, wherein the interior portion is dimensioned to accommodate a canine of any size; the interior portion includes two opposing pairs of first peripheral flotation rods transversely oriented to two opposing pairs of second peripheral flotation rods, wherein the first and second pairs of peripheral flotation rods form a nested configuration, wherein each pair of first and second flotation rods comprise an extended flotation rod and a shorter standard flotation rod, forming a staggered arrangement, wherein each standard flotation rod is disposed between the interior portion and the associated extended flotation rod, enabling the nested configuration; the interior portion includes a plurality of spaced-apart semi-rigid platform rods; at least one water drainage vent disposed near a corner of the peripheral portion; and an attachment loop disposed cater-corner to the at least one water drainage vent, wherein the device is non-inflatable.

These and other features, aspects and advantages of the present invention will become better understood with reference to the following drawings, description and claims.

BRIEF DESCRIPTION OF THE DRAWINGS

FIG. 6 is a section view of an exemplary embodiment of the present invention, taken along line 6-6 of FIG. 2; and FIG. 7 is a perspective detail view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a non-inflatable, semi-submersible flotation apparatus for a dog to stably sit, lay and move about while partially submerged in a body of water of any depth. Such an animal flotation device may have a peripheral portion defining an interior portion. The interior portion provides a generally bending-resistive area adapted to become semi-submersed within the body of water when supporting the dog, whereby the peripheral portion provides buoyancy and stability to the semi-submersed interior portion so that the dog may move around and feel safe while floating atop the body of water.

Figure 1:
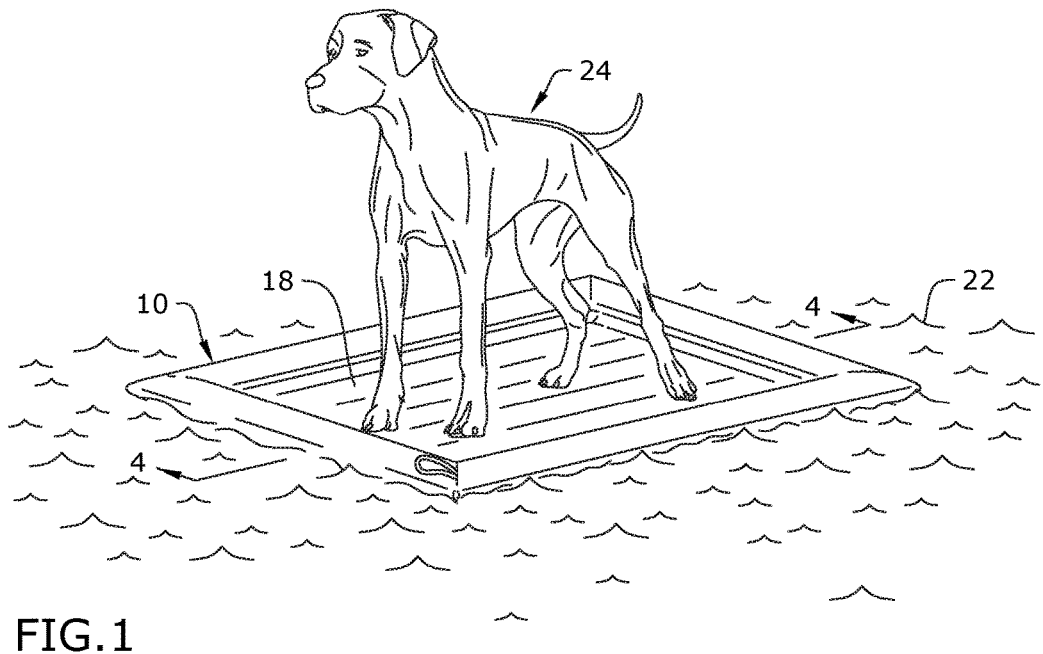
FIG. 1 is a perspective view of an exemplary embodiment of the present invention, shown in use.
Figure 2:
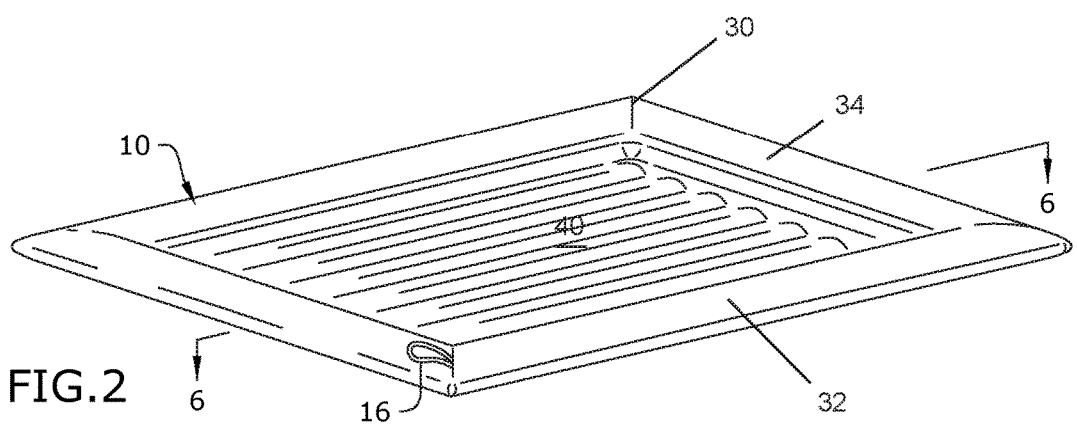
FIG. 2 is a perspective view of an exemplary embodiment of the present invention.
Figure 3:
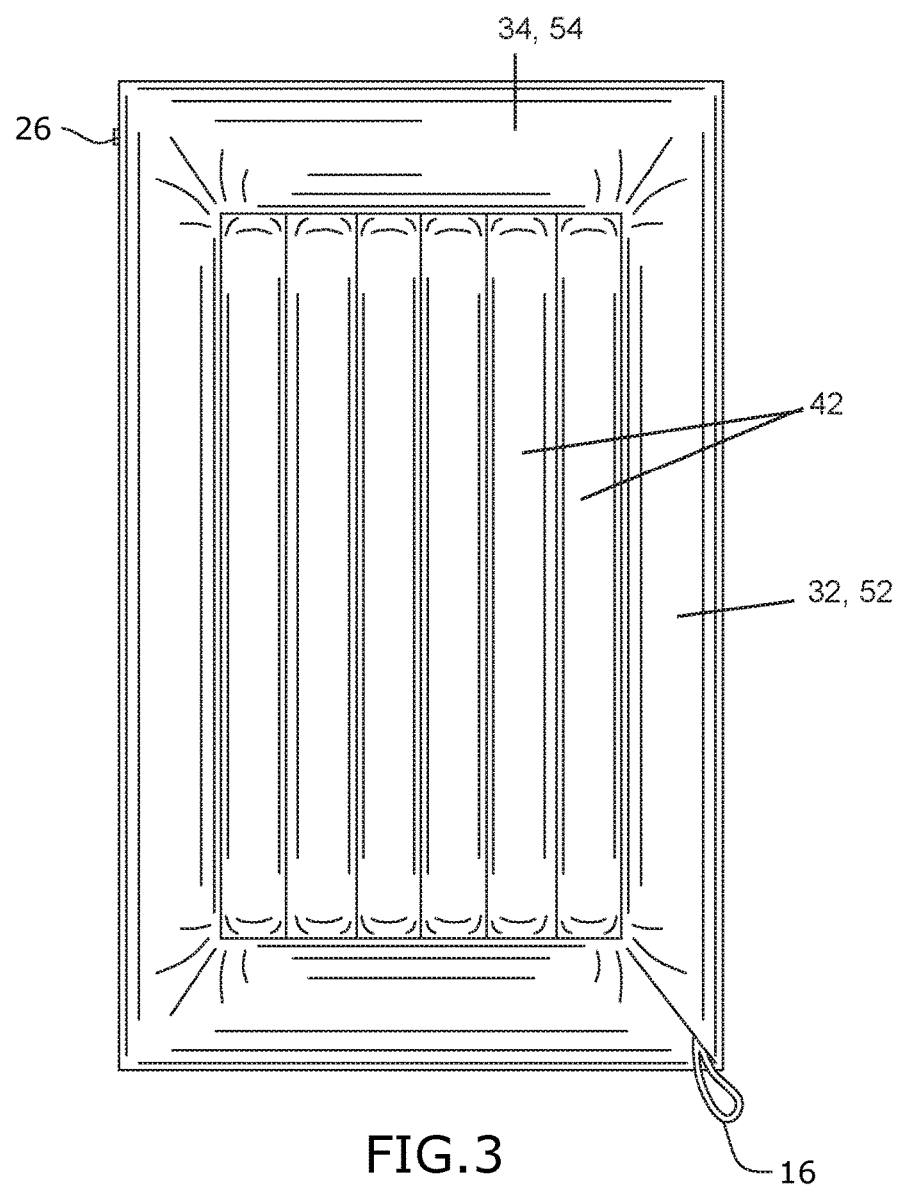
FIG. 3 is a top view of an exemplary embodiment of the present invention.
Figure 4:
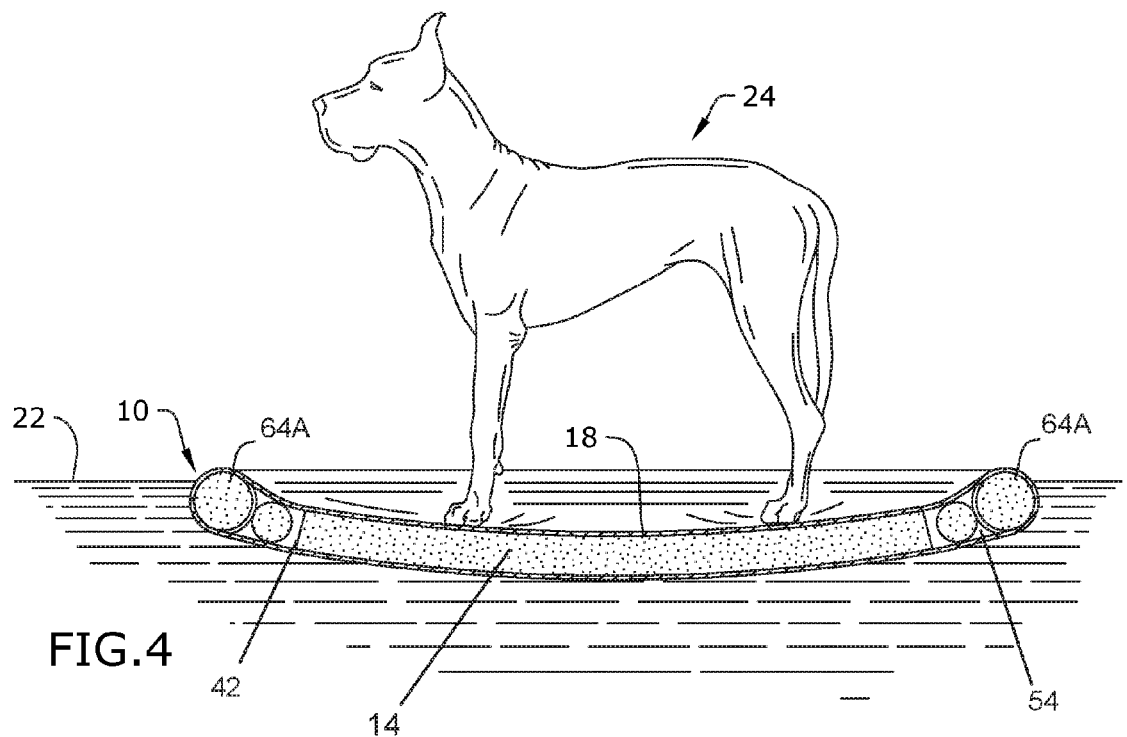
FIG. 4 is a section detail view of an exemplary embodiment of the present invention, taken along line 4-4 of FIG. 1.
Figure 5:
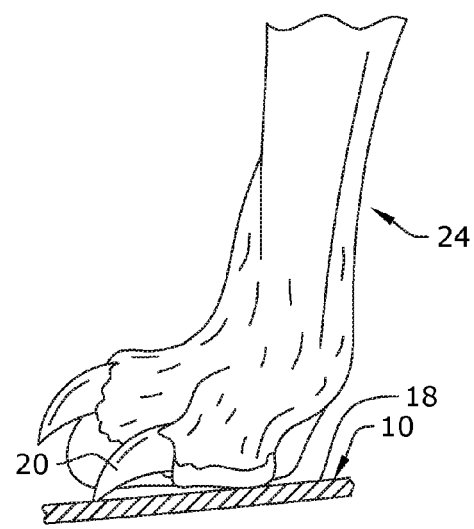
FIG. 5 is a detail section view of an exemplary embodiment of the present invention.

Referring to FIGS. 1 through 7, the present invention may include an animal flotation device 10 according to an embodiment of the invention, as shown in FIG. 2 in a perspective view. The animal flotation device 10 may include a housing membrane 18. The housing membrane 18 may define a cavity body so that the housing membrane 18 may form a plurality of parallel and transverse compartments wherein rods may be housed, making manufacture simple as one type of housing membrane may be used to form the compartments along interior and peripheral portions 40 and 30, respectively, and their associated compartments, 42 and 52, 54. The housing membrane 18 may be a water permeable membrane, such as vinyl coated nylon or the like, allowing water to enter the cavity body and its compartments so as to enable a semi-submersible apparatus. The housing membrane 18 may be made of material of sufficient strength and toughness to prevent rips and punctures by the claws 20 of an animal 24, including but not limited to any sized canine.

The housing membrane 18 may have a peripheral portion 30 and an interior portion 40. The peripheral portion 30 may form two opposing first peripheral portions 32 and two opposing second peripheral portions 34, thereby defining the extent of the interior portion 40.

The interior portion 40 may provide a plurality of spaced-apart, parallel interior compartments 42 extending generally between the second peripheral portions 34. Each interior compartment 42 is dimensioned and adapted to house an interior platform rod 14. Each interior platform rod 14 may be made of water resilient material of sufficient bending resistive strength so as to prevent the interior portion 40 from folding or collapsing while the animal 24 is either trying to get on it, is on it or is trying to get off it. The interior platform rods 14 may not be adapted to provide additional buoyancy. With the interior platform rods 14 having similar dimensions, the interior portion 40 may be well suited as a generally flat seating, laying or standing area for the animal 24. Therefore, the animal 24 may be standing on the interior portion 40, which because the housing membrane 18 allows water to freely pass, becomes partially submerged, cooling the animal 24 off. The overall dimensions of the interior portion 40 may be sufficient to accommodate even the largest of dogs in a laying down position.

Each of the first and second peripheral portions 32, 34 may form first and second peripheral compartment 52, 54, respectively. Each peripheral compartment 52, 54 may be dimensioned and adapted to house two peripheral flotation rods: two first peripheral flotation rods 62 and two second peripheral flotation rods 64, respectively.

The two first peripheral flotations rods 62 include an extended first peripheral flotation rod 62A that extends farther than a standard first peripheral flotation rod 62B, though rods 62A and 62B have the same or similar thicknesses or diameters, as the case may be. Rod 62B is disposed between the interior portion 40 and rod 62B, forming a first "staggered" arrangement as illustrated in FIG. 6.

The two second peripheral flotations rods 64 may include an extended second peripheral flotation rod 64A that extends farther than and has a greater thickness or diameter (as the case may be) than a standard second peripheral flotation rod 64B. Rod 64B is disposed between the interior portion 40 and rod 64A, forming a second "staggered" arrangement, as illustrated in FIG. 6. The first and second staggered arrangements define a nested configuration, with rods 64B extending between the two rods 62B, and rods 64A extending between only the two rods 62A, as illustrated in FIG. 6. The flotation rods 62, 64 provide flotation and buoyancy capability for the animal flotation device 10, as well as the stabilizing mechanism along the peripheral portions 40 thereof, and so are dimensioned and arranged to ensure the best flotation, submersion and balance of the animal flotation device 10. As a result, the animal flotation device 10 provides a semi-submersible tendency along the interior portion 40 while maintaining a strong buoyancy and stability through the peripheral portion 30.

The housing membrane 18 may provide water drainage vents 26 fluidly communicating to the cavity body and thus the plurality of compartments 42, 52, and 54, enabling easy, rapid drainage of water therefrom.

An attachment loop 16 may be attached to the housing membrane 18, wherein the attachment loop 16 may be designed to allow a rope or clamp to be attached to the animal flotation device 10. The attachment loop 16 may be made of the nylon webbing and be attached cater-corner from the water drainage vents 26. The attachment loop 16 offers the ability to tether the animal flotation device 10 to a boat, dock, handrail, or any secure area.

A method of using the present invention may include the following. The animal flotation device 10 disclosed above may be provided and placed on a body of water 22. An animal 24, such as a pet dog may climb into or be placed within the interior portion 40 causing the interior portion 40 to become partially or semi-submerged, thereby cooling the animal 24 off, while the peripheral portion 30 provides the buoyance and stability for the animal 24 to feel safe and relaxed. The animal may use the peripheral portion 30, and its inherent buoyancy and stability to aid in the climbing into the lower (non-buoyant) profiled interior portion 40.

It should be understood, of course, that the foregoing relates to exemplary embodiments of the invention and that modifications may be made without departing from the spirit and scope of the invention as set forth in the following claims.

What is claimed is:

1. An animal floatation device, comprising:
a housing membrane having an interior portion connected to and defined by a peripheral portion, wherein the interior portion provide a semi-rigid platform, and wherein the periphery portion provides a buoyancy so that the interior portion becomes semi-submerged when the device is placed on a body of water, wherein the interior portion is dimensioned to accommodate a canine,
wherein the interior portion includes two opposing pairs of first peripheral flotation rods transversely oriented to two opposing pairs of second peripheral flotation rods, wherein the first and second pairs of peripheral flotation rods form a nested configuration.

2. The animal floatation device of claim 1, wherein the housing membrane is water permeable.

3. The animal floatation device of claim 1, wherein the device is non-inflatable.

4. The animal floatation device of claim 1, wherein each pair of first and second flotation rods comprise an extended flotation rod and a shorter flotation rod, forming a staggered arrangement, wherein each flotation rod is disposed between the interior portion and the associated extended flotation rod, enabling the nested configuration.

5. The animal floatation device of claim 4, wherein the interior portion includes a plurality of spaced-apart semi-rigid platform rods.

6. The animal floatation device of claim 5, wherein each platform rod is respectively housed in an interior compartment of a plurality of interior compartments formed from the housing membrane, wherein each pair of peripheral flotation rods are respectively housed in a peripheral compartment of a plurality of peripheral compartments formed from the housing membrane.

7. The animal floatation device of claim 1, wherein the housing membrane provides at least one water drainage vent.

8. The animal floatation device of claim 7, wherein the housing membrane provides an attachment loop disposed cater-corner to the at least one water drainage vent.

* * * * *